United States Patent
Handing et al.

(10) Patent No.: US 9,393,923 B2
(45) Date of Patent: Jul. 19, 2016

(54) BUMPER ARRANGEMENT FOR A MOTOR VEHICLE

(71) Applicant: BENTELER AUTOMOBILTECHNIK GMBH, Paderborn (DE)

(72) Inventors: Christian Handing, Langenberg (DE); Annika Schultz, Paderborn (DE); Mirko Paare, Paderborn (DE); Dariusz Straznikiewicz, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 14/719,517

(22) Filed: May 22, 2015

(65) Prior Publication Data

US 2015/0336526 A1    Nov. 26, 2015

(30) Foreign Application Priority Data

May 23, 2014   (DE) .......................... 10 2014 107 320

(51) Int. Cl.
| | |
|---|---|
| *B60R 19/26* | (2006.01) |
| *B60R 19/34* | (2006.01) |
| *B60R 19/03* | (2006.01) |
| *B60R 19/24* | (2006.01) |
| *B60R 11/00* | (2006.01) |

(52) U.S. Cl.
CPC ................. *B60R 19/34* (2013.01); *B60R 19/03* (2013.01); *B60R 2011/0085* (2013.01); *B60R 2019/247* (2013.01); *B60R 2019/262* (2013.01)

(58) Field of Classification Search
CPC ...... B62D 21/15; B62D 21/152; B60R 19/24; B60R 19/26; B60R 19/34; B60R 19/03; B60R 19/2019; B60R 19/247; B60R 19/262

USPC .................. 293/132, 133; 296/187.09, 187.1
See application file for complete search history.

(56) References Cited

U.S. PATENT DOCUMENTS

| | | | | |
|---|---|---|---|---|
| 3,506,295 A | * | 4/1970 | Yancey .................. | B60R 19/18 181/207 |
| 2001/0013705 A1 | | 8/2001 | Okamura et al. | |
| 2002/0043809 A1 | * | 4/2002 | Vismara .................. | B60R 19/18 293/133 |

(Continued)

FOREIGN PATENT DOCUMENTS

DE    102009053369    5/2011

OTHER PUBLICATIONS

Official Action for German Patent Application No. 102014107320.7, dated Feb. 5, 2015, 7 pages.

*Primary Examiner* — Gregory Blankenship
(74) *Attorney, Agent, or Firm* — Sheridan Ross P.C.

(57) ABSTRACT

A bumper arrangement for a motor vehicle having a crossmember which can be coupled to longitudinal members via crash boxes, wherein the crash boxes are arranged between the crossmember and a flange plate which is assigned to the respective crash box and which is designed to couple to a longitudinal member is provided. In this context, each crash box is assigned at least one strut which is supported both on in each case one end of the crash box pointing away from the crossmember and/or a flange plate as well as on the crossmember, wherein the at least one strut is arranged in the longitudinal extent of the crossmember between two crash boxes and has at least one predefined deformation point.

20 Claims, 4 Drawing Sheets

(56) References Cited

U.S. PATENT DOCUMENTS

| | | | | |
|---|---|---|---|---|
| 2011/0309606 A1* | 12/2011 | Klimek | ................. | B60D 1/485 280/784 |
| 2013/0154287 A1* | 6/2013 | Lee | ........................ | B60R 19/34 293/133 |
| 2014/0361562 A1* | 12/2014 | Borger | ................... | B60R 19/34 293/133 |
| 2015/0108775 A1* | 4/2015 | Nakanishi | ............... | B60R 19/34 293/133 |
| 2015/0115633 A1* | 4/2015 | Braunbeck | .............. | B60R 19/04 293/132 |
| 2015/0336526 A1* | 11/2015 | Handing | ................ | B60R 19/34 293/133 |

* cited by examiner

BUMPER ARRANGEMENT FOR A MOTOR VEHICLE

CROSS-REFERENCE TO RELATED APPLICATIONS

This application claims the benefit of German Patent Application No. DE 102014107320.7 filed May 23, 2014, the entire contents of which are incorporated herein by reference.

FIELD

The invention relates to a bumper arrangement for a motor vehicle as claimed in the preamble of patent claim 1.

BACKGROUND

Many bumper arrangements of this type are already known, for example also from DE 20 2012 003 073 U1 and DE 10 2005 029 726 B4. The bumper arrangements for a motor vehicle in these documents have in this context a crossmember which can be coupled to longitudinal members via crash boxes, wherein the crash boxes are arranged between the crossmember and a flange plate which is assigned to the respective crash box and which is designed to couple to a longitudinal member. The crash boxes are provided here for the purpose that in the event of a crash, a defined portion of the applied energy is already consumed for the deformation of the entire bumper arrangement, in particular of the crash boxes, and targeted deformation of the crash boxes or of the entire bumper arrangement takes place. This ensures that a portion of the energy which is introduced in the event of a crash is already absorbed by the bumper arrangement and therefore damage to the rest of the bodywork, in particular to the longitudinal members, is avoided, and a sudden and excessively high level of force is prevented. In this respect, an increased degree of safety for the vehicle occupants in the event of a crash is achieved thereby.

However, during the entire development of new motor vehicles, ever more stringent requirements are made to minimize the energy consumption or fuel consumption.

SUMMARY

The object of the invention is therefore to make available a bumper arrangement for a motor vehicle according to the preamble of patent claim 1, in which bumper arrangement the energy consumption or fuel consumption is minimized without having to dispense with the stringent requirements in respect of the safety which has to be ensured for the vehicle occupants.

This object is achieved by means of a bumper arrangement for a motor vehicle having all the features of patent claim 1. Advantageous embodiments of the invention can be found in the dependent claims.

The bumper arrangement according to the invention for a motor vehicle has here a crossmember which can be coupled to longitudinal members via crash boxes, wherein the crash boxes are arranged between the crossmember and a flange plate which is assigned to the respective crash box and which is designed to couple to a longitudinal member. According to the invention, each crash box is then assigned at least one strut which is supported both on in each case one end of the crash box pointing away from the crossmember and/or a flange plate as well as on the crossmember, wherein the at least one strut is arranged in the longitudinal extent of the crossmember between two crash boxes and has at least one predefined deformation point.

In fact, it has surprisingly been found that despite additional components in the form of the at least one strut to which each crash box is assigned, the overall weight of the bumper arrangement can be significantly reduced without having to accept compromises in respect of safety. In this context, a significant fuel saving or energy saving during the operation of a motor vehicle which is equipped with a bumper arrangement according to the invention can be implemented. This is achieved in that owing to the additional struts with their predefined deformation points, the associated crash boxes can be dimensioned in such a way that their weight is significantly reduced. Although the additional struts involve additional weight, a significant reduction in the overall weight of the bumper arrangement can be achieved by reducing the weight of the crash boxes.

As standardized tests have shown, in this context it is not necessary to accept any reduction in safety for the occupants of a motor vehicle equipped with a bumper arrangement according to the invention despite the smaller overall weight of the bumper arrangement. Instead, in the event of a crash, additional predefined deformation points of the struts permit the deformations of the crash boxes and therefore of the entire bumper arrangement to be controlled in an even more targeted fashion or to be adapted to present conditions during the development and the design of bumper arrangements for various motor vehicles, with the result that in the event of a crash a very small intrusion depth is achieved and the safety of motor vehicle occupants in the event of a crash is even improved or increased.

According to a first advantageous embodiment of the invention, the strut has, in the region of the at least one predefined deformation point, ductility which is different from the rest of the strut, with the result that the strut can more easily be deformed in the region of the at least one predefined deformation point. By means of such a change in the ductility of the strut in the region of a predefined deformation point, the desired deformability of the strut can easily be set and adapted to various bumper arrangements for a wide variety of motor vehicles.

It has proven particularly advantageous in this context to generate the different ductility by partial heat treatment of the strut in the region of the at least one predefined deformation point. Such heat treatments, in particular of metals and alloys which are used for such components of bumper arrangements, are already very well researched and capable of being well handled in terms of processing technology, with the result that the desired ductile properties of the struts can therefore be set very well. In particular, the use of aluminum has also proven suitable here.

However, alternatively it is also possible to embody the at least one predefined deformation point of the strut as a bead. The manufacture of such beads can be controlled very well and targetedly in terms of processing technology too, with the result that in this context the desired deformation properties of the struts can also be set very well.

In order to be able to control the deformation properties of the struts particularly well, at least two predefined deformation points, in particular beads or heat-treated regions are provided for a strut, wherein these two predefined deformation points are preferably arranged parallel to one another. However, such a predefined deformation point can also be embodied as a hole or an opening in the metal, which additionally entails the advantage that such a predefined deformation point can also be used to feed in and/or secure the bumper arrangement according to the invention during assembly.

Insofar as beads are provided as predefined deformation points, the deformation properties of the strut can be particularly well controlled owing to the depth of the beads and/or the length thereof in the side wall profile of the strut. In this context, it has proven particularly advantageous for the entire deformation of the bumper arrangement in the event of a crash if the depth of the beads of a strut decreases with its distance from the crossmember. This is advantageous, in particular, against the background that the bead which is arranged closer to the crossmember must react earlier in the event of a crash than beads located further behind. As a result of the greater depth of this bead, better deformability of the strut in the region of this deeper bead is achieved, with the result that in the event of a crash it deforms there first.

In this context, at least one predefined deformation point can be arranged on the side facing the crash box, or the side facing away from the crash box, of the respective strut which is assigned to the crash box. It is therefore possible to set a targeted deformation profile for the respective crash requirements which differ on a regional basis. For example, within the scope of the invention it can be provided that Z-shaped deformation of the strut is set in a targeted fashion by means of a predefined deformation point which is close to the crossmember, on the side of the strut facing away from the crash box, and a second predefined deformation point which is close to the flange plate, on the side of the strut facing the crash box, which Z-shaped deformation of the strut does not impede the simultaneously occurring targeted energy-absorbing deformation of the crash box.

So that particularly good energy absorption of the bumper arrangement is provided, an angle α is formed between a projection of the longitudinal axis of the crash box and a projection of the longitudinal axis of the strut into an X-Y plane running parallel to the plane of the underlying surface, wherein the angle α is between 5° and 70°, preferably between 10° and 60° and particularly preferably between 15° and 50°. This permits an even better input of energy into the bumper arrangement to be implemented, as a result of which the safety of the vehicle occupants in the event of a crash is also increased and the risk of injury minimized.

The embodiment of the invention according to which the strut is arranged with its longitudinal axis in its projection into an X-Z plane running perpendicularly with respect to the plane of the underlying surface at an angle β with respect to the planes of the flange plate, wherein the angle β is between 60° and 80°, preferably between 65° and 75° and is particularly preferably 70°, tends in the same direction. In particular, a vertical offset between the crossmember and the flange plate or longitudinal members of the motor vehicle which is equipped with a bumper arrangement according to the invention can be implemented by means of such an angle β with the struts, which is advantageous for the compatibility of various vehicle classes in the event of a head-on impact, such as, for example, SUV versus small car owing to their different structural design, in particular in terms of the ground clearance of the longitudinal members.

According to a further concept of the invention, the crossmember, the crash boxes and/or the at least one strut are embodied as extrusion profiles. Since these parts of the bumper arrangement are manufactured from metals, steels or alloys, the embodiment as extrusion profiles is suitable since the extrusion can be well handled in terms of processing technology and therefore the desired physical properties of these parts can be implemented relatively easily.

In order to increase the stability of the connection of the respective strut to the crossmember, it is possible to provide that a supporting ballast for supporting the strut on the crossmember is arranged in the crossmember which is embodied in this case as an open or closed hollow profile.

It has therefore also proven advantageous to embody the crossmember in a hat shape or U shape in cross section. In this case, in fact, such a supporting ballast can easily be arranged on or in the crossmember by means of conventional connection techniques such as, for example, welding or the like.

In the same way, the struts can also have a hat-shaped or U-shaped cross section or be embodied as a hollow profile. Such struts can easily be provided with the predefined deformation points already described above.

Further objectives, advantages, features and application possibilities of the present invention can be found in the following description of the exemplary embodiments with reference to the drawings. In this context, all the described and/or figuratively illustrated features form the subject matter of the present invention, either per se or in any appropriate combination, even independently of their combination in the claims or their back reference.

DETAILED DESCRIPTION

Figure 1:
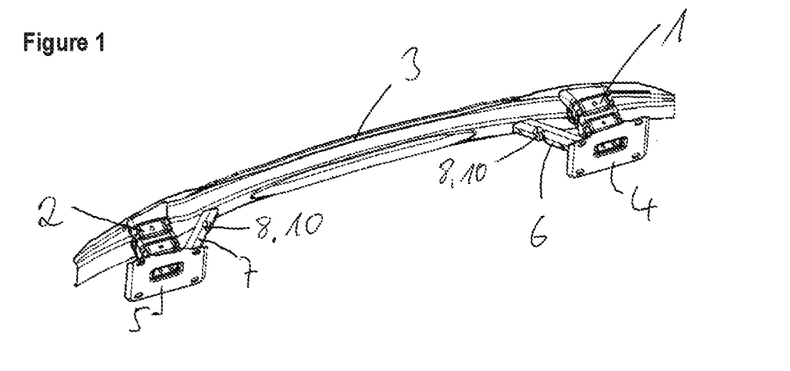
FIG. 1: shows a first exemplary embodiment of a bumper arrangement according to the invention for a motor vehicle in a perspective oblique illustration from the rear.

FIG. 1 shows a first exemplary embodiment of a bumper arrangement according to the invention for a motor vehicle in a perspective oblique illustration from the rear. The bumper arrangement is composed here essentially of a crossmember 3 which is embodied as an extrusion profile and on which in each case a crash box 1, 2 is arranged in the region of the ends of the longitudinal extent of said crossmember 3, said crash boxes 1, 2 being connected to the crossmember 3 in a materially joined or frictionally locking fashion by means of a connection method such as, for example, welding.

The crash boxes 1 and 2 have, at their end pointing away from the crossmember, in each case a flange plate 4 and 5, which serves to couple the entire bumper arrangement to a longitudinal member of a motor vehicle in a materially joined or frictionally locking fashion by means of a connection method such as, for example, welding.

Figure 2:
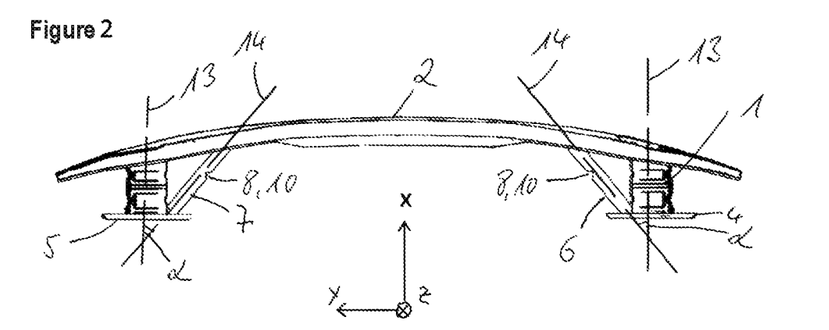
FIG. 2: shows the bumper arrangement according to FIG. 1 in a plan view from above.

As is apparent, in particular, from the illustration in FIG. 2, the struts 6, 7 are supported by their one end on the crossmember 3 and by their other end on the respective crash box 1, 2 and the respective flange plate 4, 5. In this context, in the X-Y plane an angle α, which in the present case is approximately 50°, is formed between the respective longitudinal axis 13 of the strut 6, 7 and the longitudinal axis 14 of the crash box 1, 2 which corresponds thereto.

In this context, predefined deformation points 8, which are embodied here as beads 10, are formed in the struts 6, 7. Owing to the struts 6, 7 which are embodied with these predefined deformation points 8, it is now possible to reduce the weight of the crash boxes 1 and 2 in such a way that despite the additional weight of the struts 6 and 7, the entire weight of the bumper arrangement is reduced without having to accept a compromise in terms of the safety of the motor vehicle occupants and the targeted deformation of the bumper arrangement in the event of a crash. Instead, as a result of the additional predefined deformation points 8 of the struts 6 and 7, additional possibilities are provided for controlling, in the event of a crash, the deformation of the bumper arrangement in a targeted fashion and of ensuring a very small intrusion depth.

Figure 3:
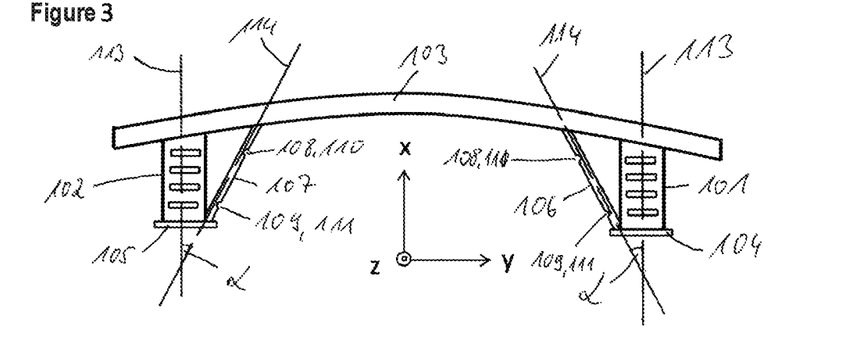
FIG. 3: shows a second exemplary embodiment of a bumper arrangement according to the invention for a motor vehicle in a plan view from above.
Figure 4:
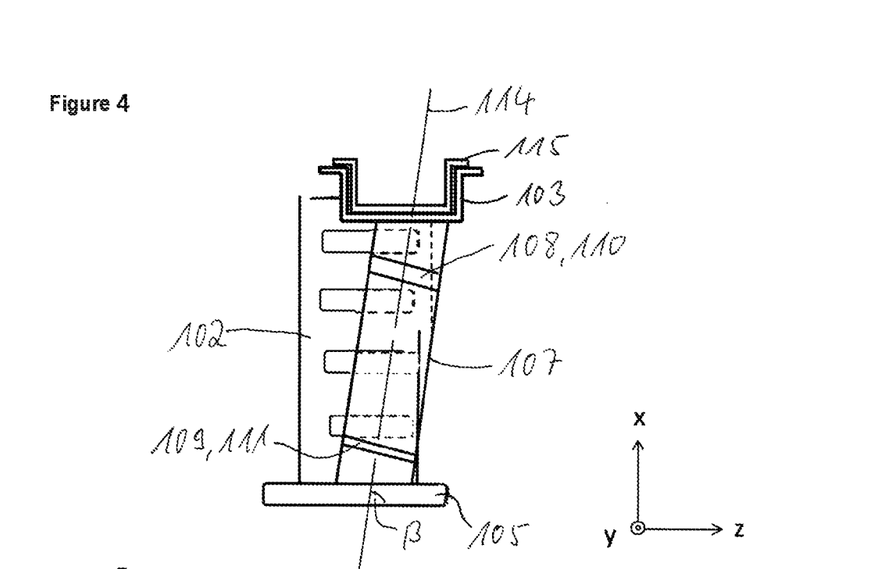
FIG. 4: shows a schematic illustration of a detail of the bumper arrangement according to FIG. 3, FIG. 5: shows a third exemplary embodiment of a bumper arrangement according to the invention for a motor vehicle in a plan view from above.

The exemplary embodiment of the FIGS. 3 and 4 differs from that in FIGS. 1 and 2 essentially in that the struts 106 and 107 there each have two deformation points 108 and 109, which are embodied here as beads 110 and 111. The crash boxes 101 and 102 there are also arranged between the crossmember 103 there and the corresponding flange plates 104 and 105. In this exemplary embodiment too, in the X-Y plane an angle α, which in the present case is also approximately 50°, is formed between the longitudinal axis 113 of the respective strut 106, 107 and the longitudinal axis 114 of the crash box 101, 102 which corresponds thereto.

As a result of the fact that in this exemplary embodiment the struts 106 and 107 have two predefined deformation points 108 and 109, an even more predictable deformation with a very small intrusion depth is possible in the event of a crash.

FIG. 4 shows a schematic illustration of a detail of the crash box 102 in FIG. 3 from a position between the crash boxes 101 and 102.

As is also apparent from FIG. 4, a vertical offset is present between the crossmember 103 and the flange plate 105 and also the flange plate 104 (not illustrated here) and the longitudinal members of the bodywork of the motor vehicle. The struts 106 and 107 which are embodied here as narrow profiled sheet-metal shaped parts are also not arranged here with their longitudinal axis 113 parallel to the longitudinal axis 114 of the crash boxes 101 and 102. Instead, they are positioned with their longitudinal axis 113 at an angle β of approximately 70° with respect to the longitudinal axis 114 of the crash boxes 101 and 102. As a result of this embodiment, a vertical offset is achieved between the crossmember 103 and flange plate 104 or the longitudinal members of the motor vehicle, as a result of which such a connection of the struts also makes possible a significantly improved deformation with a small intrusion depth in the event of a crash, which complies with the legally required crash standards.

The struts 106 and 107 are preferably, on the one hand, connected here in a materially joined fashion, for example by welding, to the flange plate 104 and, on the other hand, supported on the respective crash box 101 or 102.

It is apparent that, at the front end of the crash box 102 which faces the crossmember 103, the crossmember 103 which is to be attached to the flange plate 104 is encompassed from above by the crash box 103 despite the slight inclination of the crash box 103 with respect to the flange plate 104, as a result of which an additional vertical offset can be implemented between the crossmember 103 and the flange plate 104 or the longitudinal members of the motor vehicle which is equipped with a bumper arrangement according to the invention. As a result of the greater inclination of the strut 107, the latter supports the crossmember 103, in particular in the central and/or lower part of the cross section thereof or the rear wall thereof which points to the motor vehicle, with respect to the vehicle vertical axis (Z axis). The crash box 103 is no longer formed in this region, with the result that the crossmember is supported solely by the strut 107.

Figure 5:
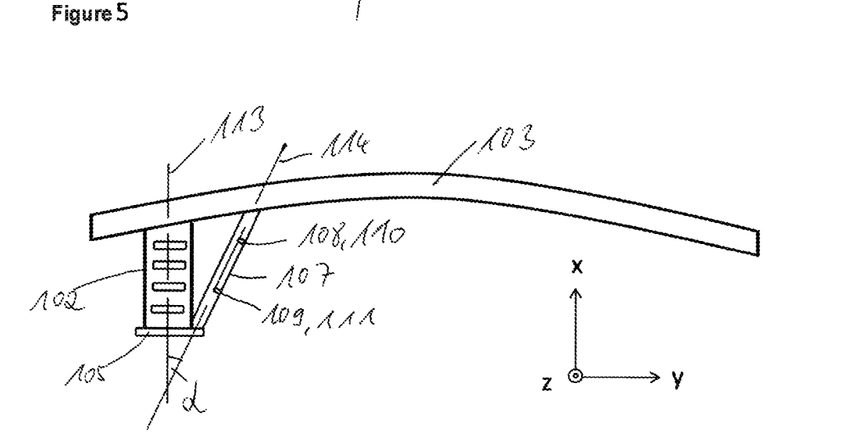

Even though this arrangement of the struts 106 and 107 with an angle β is shown here explicitly only for the exemplary embodiment in FIGS. 3 to 5, the struts 6 and 7 of the exemplary embodiment in FIGS. 1 and 2 can also be arranged in such a way, and the advantages described above are therefore also used for this exemplary embodiment.

Figure 6:
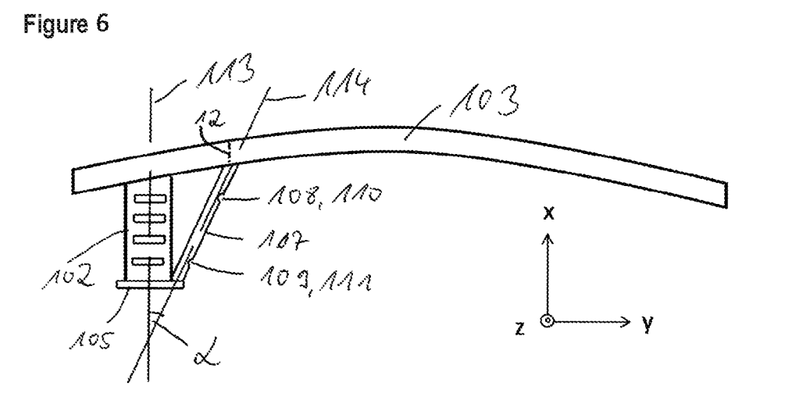
FIG. 6: shows a fourth exemplary embodiment of a bumper arrangement according to the invention for a motor vehicle in a plan view from above.

FIGS. 5 and 6 now show two further exemplary embodiments of a bumper arrangement according to the invention for a motor vehicle, but, for the sake of simplicity, only one crash box 102 is shown with a flange plate 105 and strut 107. While in the exemplary embodiment in FIG. 7 the predefined deformation points 108 and 109 are embodied again as beads 110 and 111, the predefined deformation points 108 and 109 in FIG. 5 are formed by heat treatment of the strut 107. As a result of the heat treatment, the strut 107 is given a different ductility in the region of the predefined deformation points 108 and 109 with respect to the rest of the strut 107, with the result that the strut 107 can be deformed more easily in the region of the predefined deformation points 108 and 109. So that the predefined deformation point 108 which is arranged closer to the crossmember 103 is deformed firstly in the event of a crash compared to the predefined deformation point 109 which is arranged further away from the crossmember 103, the heat treatment of the two predefined deformation points 108 and 109 is different in such a way that the predefined deformation point 108 is softer, that is to say easier to deform than the predefined deformation point 109.

For the exemplary embodiment in FIG. 6, the same effect is achieved in that the predefined deformation point 108 which is arranged closer to the crossmember 103 has a greater depth than the predefined deformation point 109 which is arranged further away from the crossmember 103. In addition, in the exemplary embodiment in FIG. 7 the crossmember 103 is provided, in the region of the connection of the strut 107, with a supporting ballast 12 on which the strut 107 can be supported to a greater degree. The supporting ballast 12 is therefore a reinforcement of the crossmember 103 in the region of the connection of the strut 107, so that in the event of a crash the energy which is input is also directed in a targeted fashion into the strut 107. Instead of the supporting ballast 12 which is arranged transversely in the crossmember 103, local reinforcement in the form of plastic parts or a sheet-metal patch is also possible.

Figure 7:
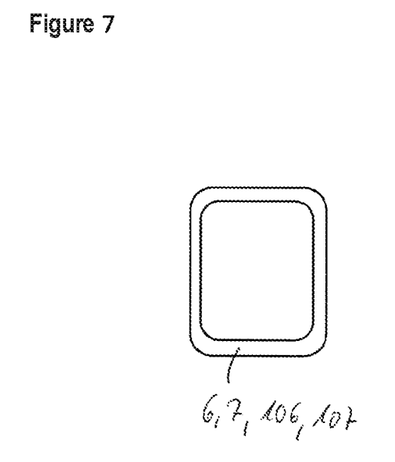
FIG. 7: shows a first exemplary embodiment of a strut of a bumper arrangement for a motor vehicle in a cross-sectional illustration.
Figure 8:
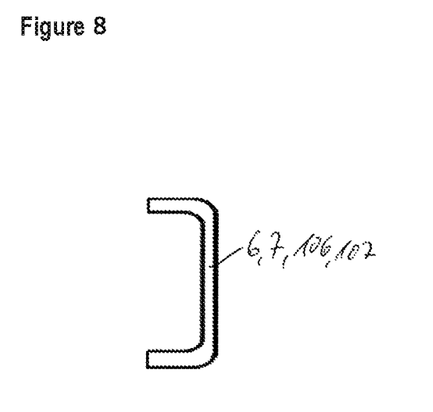
FIG. 8: shows a second exemplary embodiment of a strut of a bumper arrangement for a motor vehicle in a cross-sectional illustration.

FIGS. 7 and 8 show by way of example two possible cross sections for the struts 6, 7, 106 and 107. While the cross section in FIG. 8 is a strut 6, 7, 106 and 107 with a closed hollow profile in the form of a rectangle with rounded corners, the profile of the struts 6, 7, 106 and 107 in FIG. 9 is U-shaped in cross section, that is to say embodied in an open way, for example as a sheet-metal shaped part.

Figure 9:
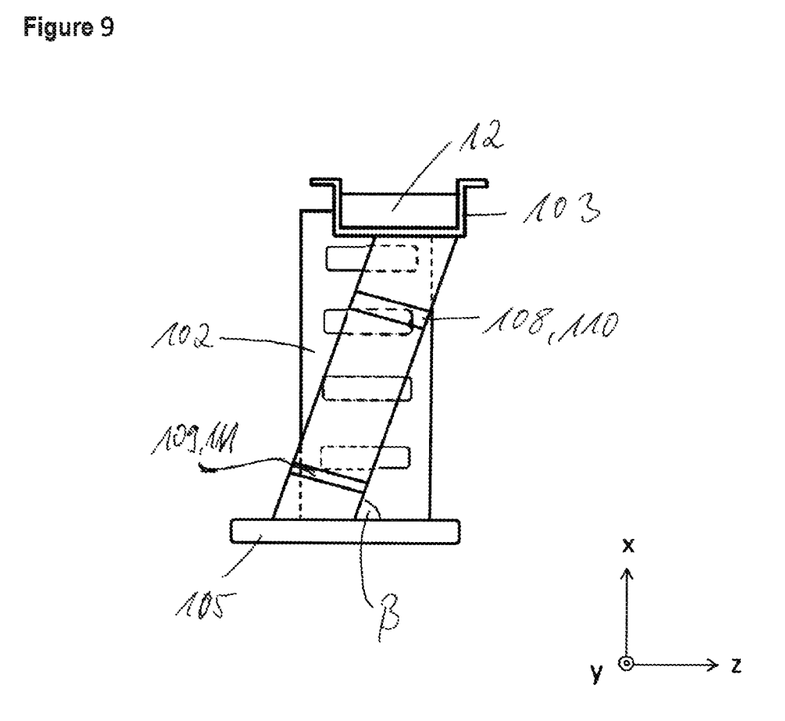
FIG. 9: shows an illustration of a detail of a bumper arrangement according to the invention for a motor vehicle.

In the illustration in FIG. 9, an illustration of a detail of a bumper arrangement according to the invention for a motor vehicle for the exemplary embodiment in FIG. 3 is shown.

However, of course all the further conceivable exemplary embodiments which are described can also be embodied in this way. The hat-shaped embodiment of the crossmember 103 as an open profile in which a supporting ballast 12 is arranged in order to support the strut 107 is clearly apparent here. Both the crash box 102 and the strut 107 are connected here, both to the flange plate 105 and to the crossmember 103. However, while the crash box 103 is positioned with its longitudinal axis in the X-Z plane both on the crossmember 103 and on the flange plate 105 essentially at an angle of 90°, that is to say perpendicularly, the strut 107 is inclined with its longitudinal axis with respect to the crossmember 103 and the flange plate 105 in the X-Z plane. In this context, an angle β, which corresponds here to approximately 70°, is formed between the longitudinal axis of the strut 107 and the flange plate 105 or the Y-Z plane.

The predefined deformation points 108 and 109 which are formed in the strut 107 are embodied here again as beads 110 and 111. These beads 110 and 111 not only have a different depth in order to implement the desired deformation properties; instead, the beads 110 and 111 are also embodied with different widths. So that the bead 110 which is closer to the crossmember 103 again deforms earlier in the event of a crash, the bead 110 is made wider than the bead 111.

In contrast to the exemplary embodiment in FIG. 4, in the exemplary embodiment in FIG. 10, the strut 107 is arranged further offset on the flange plate 105 with respect to the crash box 102. Said strut 107 serves to bring about, in the event of a crash, a distribution of force into the flange plates and the vehicle-side longitudinal members which is as uniform as possible.

LIST OF REFERENCE NUMERALS

1 Crash box
2 Crash box
3 Crossmember
4 Flange plate
5 Flange plate
6 Strut
7 Strut
8 Predefined deformation point
10 Bead
12 Supporting ballast
13 Longitudinal axis
14 Longitudinal axis
101 Crash box
102 Crash box
103 Crossmember
104 Flange plate
105 Flange plate
106 Strut
107 Strut
108 Predefined deformation point
109 Predefined deformation point
110 Bead
111 Bead
113 Longitudinal axis
114 Longitudinal axis
115 Supporting patch
α Angle
β Angle

The invention claimed is:

1. A bumper arrangement for a motor vehicle, comprising: a crossmember that can be coupled to longitudinal members via crash boxes, wherein the crash boxes are arranged between the crossmember and a flange plate that is assigned to the respective crash box and that is designed to couple to a longitudinal member,
wherein each crash box is assigned at least one strut,
wherein the at least one strut is supported on one end by one of the crash box and a flange plate,
wherein the at least one strut is also supported by the crossmember,
wherein the at least one strut is located between two crash boxes and has at least one predefined deformation point,
wherein the at least one strut has, in a region of the at least one predefined deformation point, a ductility that is different from a ductility of the rest of the at least one strut, with the result that the at least one strut can more easily be deformed in the region of the at least one predefined deformation point, and
wherein the different ductility is generated by partial heat treatment of the at least one strut in the region of the at least one predefined deformation point.

2. The bumper arrangement as claimed in claim 1, wherein at least one predefined deformation point is arranged on at least one of the side facing the crash box and the side facing away from the crash box of the respective strut that is assigned to the crash box.

3. The bumper arrangement as claimed in claim 1, wherein the at least one strut is arranged such that a projection of the longitudinal axis of the at least one strut into an X-Z plane running perpendicularly with respect to a plane of the underlying surface is at an angle (β) with respect to a plane containing the flange plate, wherein the angle (β) is between 60° and 80°.

4. The bumper arrangement as claimed in claim 1, wherein the at least one predefined deformation point is arranged on at least one of the side facing the crash box and the side facing away from the crash box of the respective strut that is assigned to the crash box.

5. The bumper arrangement as claimed in claim 1, wherein an angle (α) is formed between a projection of the longitudinal axis of the crash box and a projection of the longitudinal axis of the strut into an X-Y plane running parallel to the plane of the underlying surface, wherein the angle (α) is between 5° and 70°.

6. The bumper arrangement as claimed in claim 1, wherein an angle (α) is formed between a projection of the longitudinal axis of the crash box and a projection of the longitudinal axis of the strut into an X-Y plane running parallel to the plane of the underlying surface, preferably between 10° and 60°.

7. The bumper arrangement as claimed in claim 1, wherein an angle (α) is formed between a projection of the longitudinal axis of the crash box and a projection of the longitudinal axis of the strut into an X-Y plane running parallel to the plane of the underlying surface, preferably between 15° and 50°.

8. A bumper arrangement for a motor vehicle, comprising: a crossmember that can be coupled to longitudinal members via crash boxes,
wherein the crash boxes are arranged between the crossmember and a flange plate that is assigned to the respective crash box and that is designed to couple to a longitudinal member,
wherein each crash box is assigned at least one strut,
wherein the at least one strut is supported on one end by one of the crash box and a flange plate,
wherein the at least one strut is also supported by the crossmember,
wherein the at least one strut is located between two crash boxes and has at least one predefined deformation point, and wherein the at least one predefined deformation point of the at least one strut is embodied as a bead.

9. The bumper arrangement as claimed in claim 8, wherein at least two beads are provided for the at least one strut, wherein said beads are preferably arranged parallel to one another.

10. The bumper arrangement as claimed in claim 9, wherein the depth of the beads of the at least one strut decreases with its distance from the crossmember.

11. The bumper arrangement as claimed in claim 8, wherein the at least one predefined deformation point is arranged on at least one of the side facing the crash box and the side facing away from the crash box of the respective strut that is assigned to the crash box.

12. The bumper arrangement as claimed in claim 9, wherein the at least one predefined deformation point is arranged on at least one of the side facing the crash box and the side facing away from the crash box of the respective strut that is assigned to the crash box.

13. The bumper arrangement as claimed in claim 10, wherein the at least one predefined deformation point is arranged on at least one of the side facing the crash box and the side facing away from the crash box of the respective strut that is assigned to the crash box.

14. The bumper arrangement as claimed in claim 8, wherein an angle ($\alpha$) is formed between a projection of the longitudinal axis of the crash box and a projection of the longitudinal axis of the strut into an X-Y plane running parallel to the plane of the underlying surface, wherein the angle ($\alpha$) is between 5° and 70°.

15. A bumper arrangement for a motor vehicle, comprising:
a crossmember that can be coupled to longitudinal members via crash boxes, wherein the crash boxes are arranged between the crossmember and a flange plate that is assigned to the respective crash box and that is designed to couple to a longitudinal member,
wherein each crash box is assigned at least one strut,
wherein the at least one strut is supported on one end by one of the crash box and a flange plate,
wherein the at least one strut is also supported by the crossmember,
wherein the at least one strut is located between two crash boxes and has at least one predefined deformation point,
wherein an angle ($\alpha$) is formed between a projection of the longitudinal axis of the crash box and a projection of a longitudinal axis of the at least one strut into an X-Y plane running parallel to a plane of the underlying surface, and
wherein the angle ($\alpha$) is between 5° and 70°.

16. The bumper arrangement as claimed in claim 15, wherein the crossmember, and at least one of the crash boxes and the at least one strut are embodied as extrusion profiles.

17. The bumper arrangement as claimed in claim 15, wherein a supporting ballast, an insert, a patch or a local thickened portion is provided in the crossmember in order to support the at least one strut on the crossmember.

18. The bumper arrangement as claimed in claim 15, wherein the crossmember is embodied in a hat shape or a U shape in cross section.

19. The bumper arrangement as claimed in claim 15, wherein the at least one strut has a hat-shaped or a U-shaped cross section or is embodied as a hollow profile.

20. The bumper arrangement as claimed in claim 15, wherein the at least one predefined deformation point is arranged on at least one of the side facing the crash box and the side facing away from the crash box of the respective strut that is assigned to the crash box.

* * * * *